United States Patent [19]
Spaulding

[11] Patent Number: 5,673,738
[45] Date of Patent: Oct. 7, 1997

[54] FILL CONDUIT FOR FUEL TANK

[75] Inventor: Paul J. Spaulding, Syracuse, N.Y.

[73] Assignee: Carrier Corporation, Syracuse, N.Y.

[21] Appl. No.: 573,773

[22] Filed: Dec. 18, 1995

[51] Int. Cl.⁶ .................................................. B65B 1/04
[52] U.S. Cl. .......................... 141/392; 141/286; 220/86.1
[58] Field of Search ................................. 141/285, 286, 141/392, 311 R, 339, 331, 333, 334; 220/86.1, 86.2, 661, 601, DIG. 32

[56] References Cited

U.S. PATENT DOCUMENTS 5,402,835  4/1995  Middleton ............................. 141/331

*Primary Examiner*—Henry J. Recla
*Assistant Examiner*—Steven O. Douglas

[57] ABSTRACT

A conduit for filling a tank with a liquid includes an outlet end having a liquid outlet opening, which is fluidly coupled to the tank to be filled. The conduit includes an inlet end having a liquid inlet, adapted to be operatively engaged with a source of liquid, which is vertically spaced from the outlet by a predetermined distance. An intermediate liquid conducting section is adapted to receive liquid introduced through the inlet opening and to conduct the liquid to the outlet opening and thereby to the tank. The liquid conducting section has a length and a cross sectional shape, which in combination preclude the formation of vortex flow in the conduit at a predetermined rate of liquid flow therethrough.

8 Claims, 4 Drawing Sheets

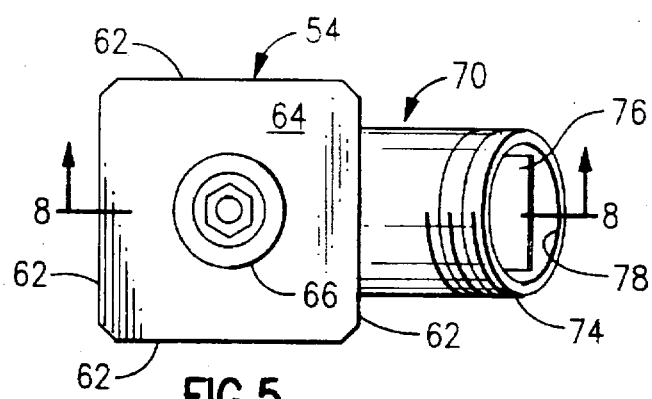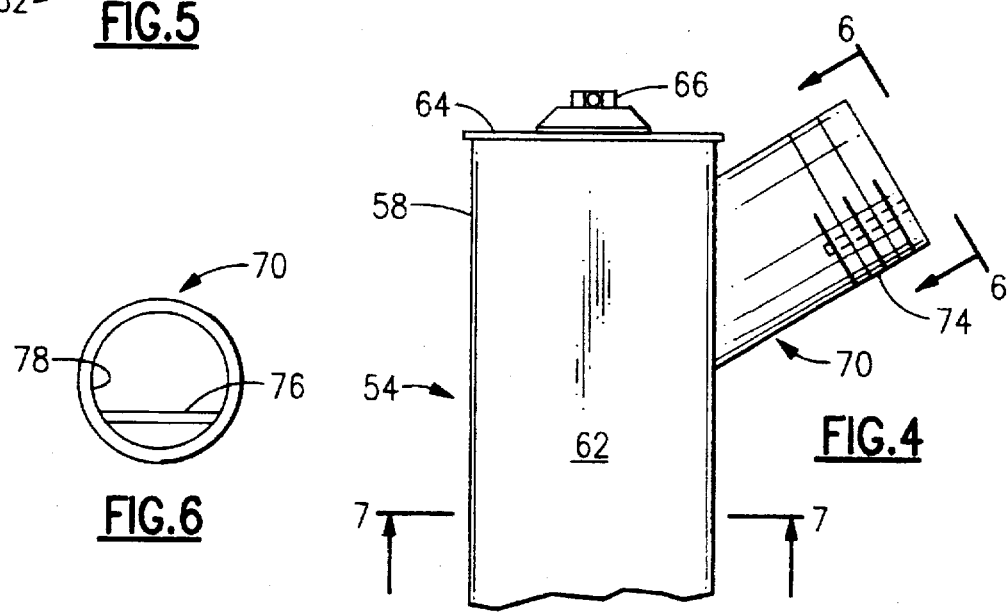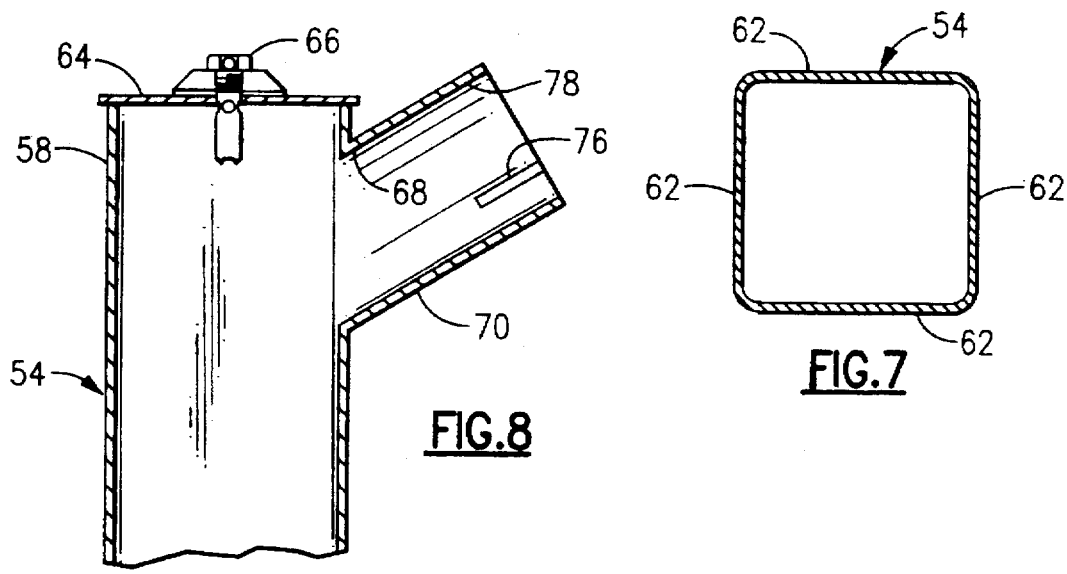

FILL CONDUIT FOR FUEL TANK

BACKGROUND OF THE INVENTION

The present invention relates to fuel fill conduits for irregularly shaped fuel tanks. More particularly, the invention relates to a fill conduit for a fuel tank forming a part of a packaged engine driven electrical generator of the type used in connection with refrigerated containers in transport applications.

An increasingly popular way of transporting goods makes use of removable cargo carrying containers, commonly referred to as "intermodal" containers, which are adapted for transport over both land and water. Such containers are designed for transport by truck or rail to a freight terminal or ship loading dock, where they may be transferred to a ship for overseas delivery.

Many of such containers are provided with refrigeration units which allow them to transport perishable goods therein. The refrigeration units attached to such containers include an electric motor for driving a refrigerant compressor forming a part of the unit. As a result, they require a source of electrical power for operation. When located at a freight terminal, a refrigerated container is provided with electrical power through a connection to a conventional source of electrical power. When located on a ship, a refrigerated container receives electrical power from the ship's electrical system. When being transported by road, rail or when no other power source is available, a temporary power source which includes a motor generator set, commonly known as a "gen set" may be mounted directly to the refrigerated container.

Since the gen set is a self-contained source of auxiliary power, it is necessary that an integral part of the gen set be a fuel tank for the motor, which is typically a diesel engine.

Many gen sets are required to have the capability to provide uninterrupted service for an extended length of time. For example, for transcontinental rail shipping, it is desirable to have a gen set which is capable of operating for more than 130 hours without the necessity of refueling. Such extended use capabilities also will increase the reliability of the system and decrease operating costs.

Accordingly, it is desirable to provide a high capacity integral fuel tank for such a gen set.

One approach to achieving a high capacity fuel tank is a fuel tank which underlies and supports the motor generator and other components of the gen set, and, which comprises an irregularly shaped "tower", which extends upwardly on one side of the gen set. The other side of the gen set may comprise a small "tower" section, however, its height is limited by the fact that various components of the gen set must be located in this space. Specifically, the radiator for cooling the diesel engine, as well as the engine exhaust pipe and the wiring harness from the generator to the outside of the gen set must pass through this region.

It should be appreciated that space is extremely limited in such a gen set because of the environment in which it is used wherein there are limitations on components extending beyond a prescribed envelope universally defined by the width of the containers on which they are used. Further, because the units are quite often mounted on containers being towed by tractor trailers, size limitations are dictated by the necessity of providing adequate clearance between the unit and the tractor unit.

Another requirement for such gen sets is that they be capable of being fueled from either side of the unit.

Accordingly, with a design that includes a tower, which extends to a relatively high elevation on one side, it is necessary that the fuel fill conduit on the other side of the unit be at the same elevation as the fill on the tower side to allow filling the tank to its full capacity and to preclude spillage.

Typically, such fuel fill conduits have comprised round fill pipes communicating the fuel fill with the fuel tank. Such high capacity fuel tanks may have a capacity of approximately 120 gallons and, accordingly, it is desired to be able to fill the units at a rate of approximately 20 gallons per minute. It has been found that with conventional round fill pipes, such a fuel fill rate cannot be achieved.

Specifically, units have been found to "burp" fuel out before the tank is sixty percent (60%) full of fuel. It has been determined that a vortex forms in the fuel conduit thereby reducing the rate of fuel flow therethrough and precluding the venting of air from the tank through the conduit and an air vent, which is typically mounted at the top of the fuel fill conduit.

It is an object of the present invention to provide an elongated conduit for filling a tank with a liquid at a high rate, which precludes formation of a vortex in the conduit.

It is a further object of the invention to provide a fuel fill conduit for a fuel tank wherein the fuel inlet is vertically displaced from the fuel tank.

It is yet another object of the invention to provide an elongated fuel fill conduit for a fuel tank which has a square cross section.

SUMMARY OF THE INVENTION

A conduit for filling a tank with a liquid includes an outlet end having a liquid outlet opening, which is fluidly coupled to the tank to be filled. The conduit includes an inlet end having a liquid inlet, adapted to be operatively engaged with a source of liquid, which is vertically spaced from the outlet by a predetermined distance. An intermediate liquid conducting section is adapted to receive liquid introduced through the inlet opening and to conduct the liquid to the outlet opening and thereby to the tank. The liquid conducting section has a length and a cross sectional shape, which in combination preclude the formation of vortex flow in the conduit at a predetermined rate of liquid flow therethrough.

BRIEF DESCRIPTION OF THE DRAWINGS

This invention may be better understood and its objects and advantages will become apparent to those skilled in the art by reference to the accompanying drawings, in which:

FIG. 4 is an enlarged elevational view of the fill conduit shown in FIG. 1;

FIG. 5 is an enlarged top elevational view of the fill conduit shown in FIG. 1;

FIG. 6 is a sectional view of the fill conduit taken along the lines 6—6 of FIG. 4;

FIG. 7 is a sectional view taken along the lines of 7—7 of FIG. 4; and

FIG. 8 is a sectional side view of the fill conduit illustrated in FIG. 4.

DESCRIPTION OF THE PREFERRED EMBODIMENT

Figure 1:
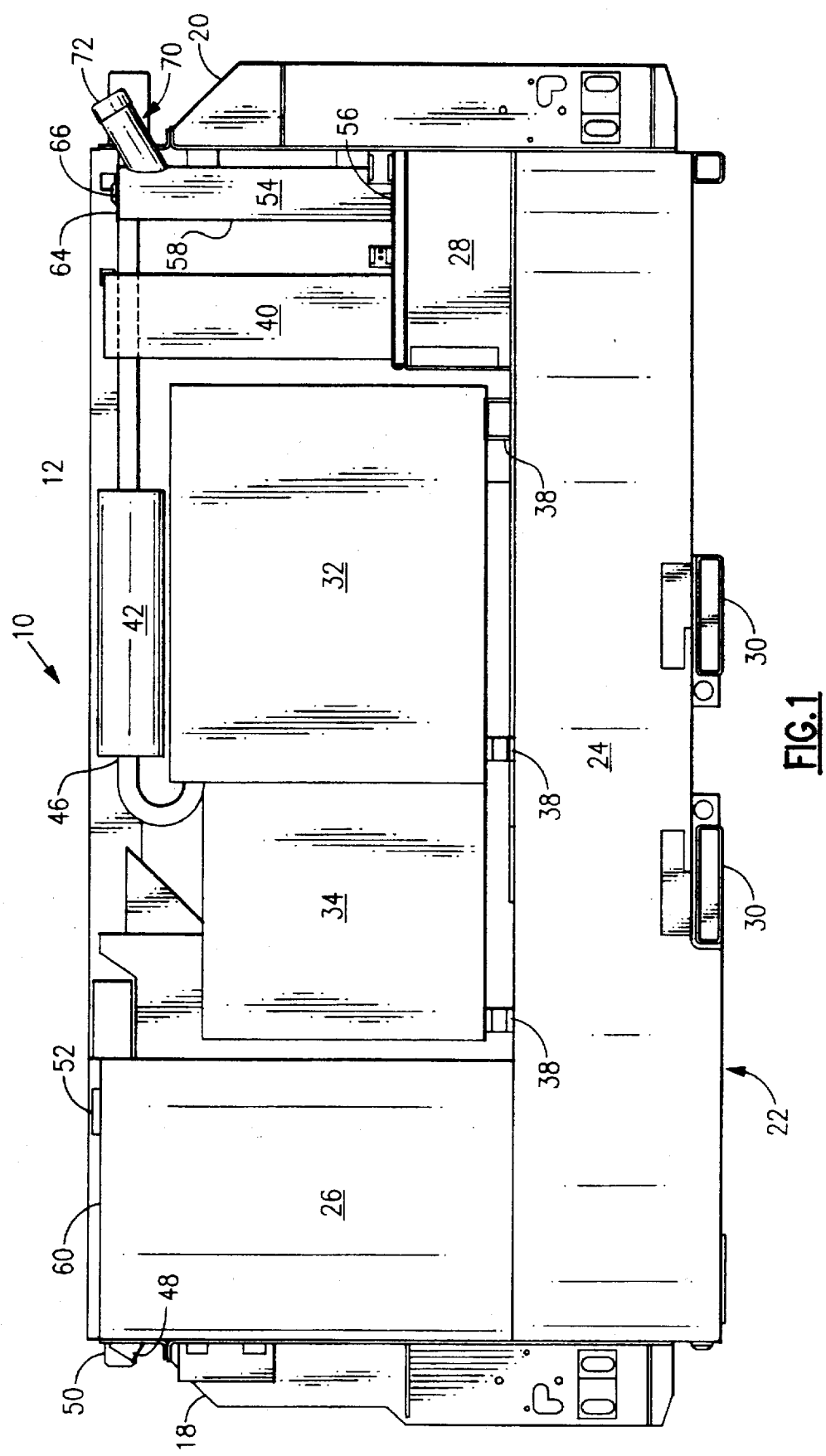
FIG. 1 is a simplified front elevational view of a generator set having a fuel fill conduit according to the present invention.

FIG. 1 illustrates a diesel driven generator set 10 which is adapted for mounting on the end of a refrigerated container in order to provide electric power to a refrigeration unit which is also mounted on the container. In operation, the generator set 10 provides a constant electrical power supply for operation of the all electric refrigeration unit.

Neither the container nor the refrigeration unit are shown in the drawings or will be described herein as they are conventional and well known in the art. The diesel driven generator set for which the present invention is specifically adapted for use is made and distributed by the Carrier Transicold Division of Carrier Corporation and marketed as Model No. 69GC15-164.

Figure 2:
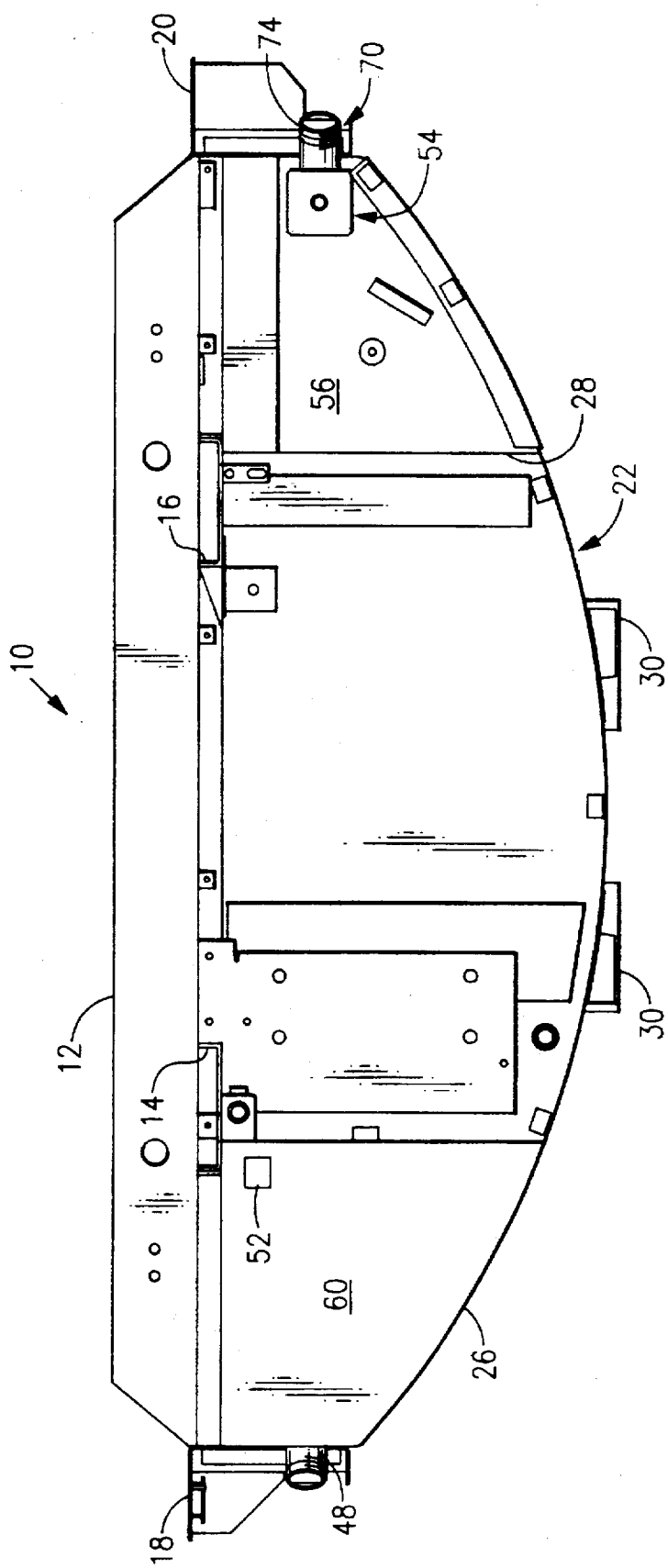
FIG. 2 is a simplified top elevational view of the generator set of FIG. 1.
Figure 3:
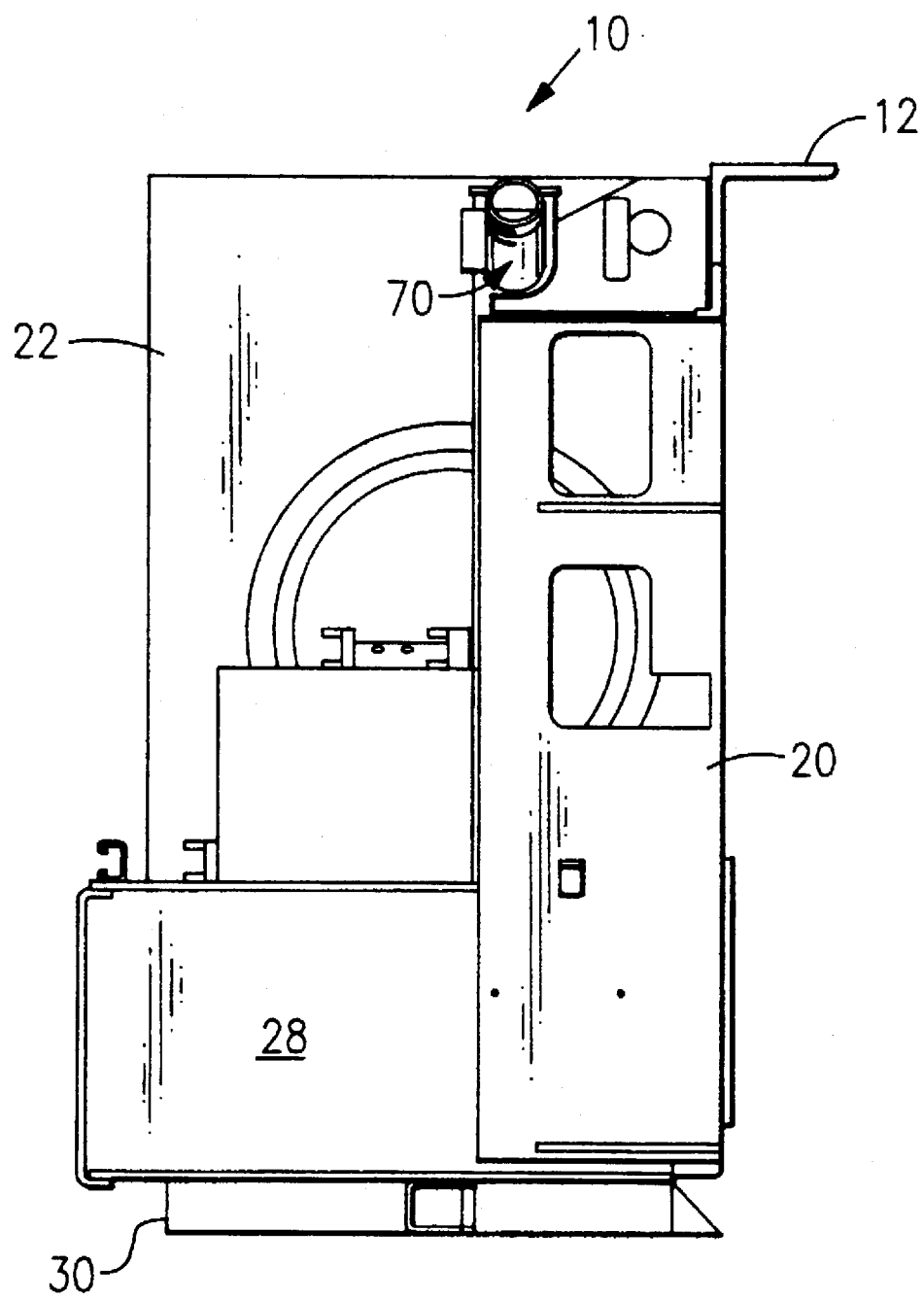
FIG. 3 is a simplified right side elevational view of the generator set of FIG. 1.

The structural frame of the generator set 10 comprises numerous structural elements including an angle iron 12, which extends across substantially the entire back side of the gen set as best seen in FIGS. 2 and 3. The angle iron 12 in turn is structurally attached to vertically extending structural elements 14 and 16 also located at the back of the gen set. The structural frame of the gen set is further defined by vertically extending structural members 18 and 20, respectively, located at the left and right hand ends of the gen set.

Each of the above described structural elements, as well as others not specifically described, are made from structural steel and are attached to the unit's fuel tank designated generally as 22.

The fuel tank 22, fabricated from steel plate, comprises a lower section 24, a left hand tower 26, which extends from the lower section upwardly to the top of the unit, and a shorter tower 28 which extends upwardly from the right hand side of the lower section 24. Underlying the fuel tank 22 are a pair of structural fork lift pockets, which form an integral part of the gen set structure and facilitate engagement by a fork lift for lifting the unit and positioning it for attachment to a refrigerated container.

Looking now at FIG. 1, the basic elements of the gen set are illustrated in block form as comprising a diesel engine 32 and an electrical generator 34 which is mechanically coupled to the diesel engine. The engine and the generator are mounted through suitable vibration isolation shock mounts, generally 38 to the upper surface 36 of the lower portion 24 of the fuel tank.

A radiator assembly 40 for cooling the diesel engine is mounted atop the short right hand tower 28. While the components of the radiator assembly 40 and its interconnection to the engine 32 are not shown, it should be evident that it occupies a substantial portion of the region to the right of the engine generator set overlying the short tower 28 of the fuel tank.

The muffler 42 is mounted in substantially overlying relationship to the engine 32. The exhaust pipe 44 extends from the muffler exit 46 and passes behind the radiator 40 where it exhausts generally to the right of the generator set 10.

With reference to FIGS. 1 and 3, the left hand tower 26 of the fuel tank is provided at the upper end thereof 60 with a fuel fill pipe 48 and a fuel fill cap 50. A suitable conventional vent is provided in the upper end 60 of the tower 26, which allows passage of air outwardly therethrough and yet prevents the flow of fuel therethrough in the event of a tip over.

Looking now at the short right hand tower 28 of the fuel tank, it will be noted, as best seen in FIGS. 1 and 2, that a fuel fill conduit 54 is welded to a fuel inlet opening provided in the upper surface 56 of the fuel tower 28. The conduit 54 extends vertically upwardly and terminates at its upper end 58 at an elevation which approximates the upper end 60 of the hand tower 26 of the fuel tank. In the actual gen set of the illustrated embodiment, the conduit length is approximately nineteen (19) inches from the upper surface 56 of the tank to its upper end 58.

As best shown in FIGS. 4 through 8, the conduit 54 has a substantially square cross section and, in the illustrated embodiment, each side 62 measures approximately three and one-half (3½) inch. The upper end 58 of the conduit 54 is closed by a substantially rectangular plate 64, which has mounted therein a fuel vent 66 similar in design to that described in connection with the left hand tower 26.

An opening 68 is provided in one side 62 of the conduit 54 adjacent the top in which is welded an angularly disposed circular fill pipe 70. The fill pipe is provided with threads 74 on the exterior thereof to facilitate receiving a threaded fuel cap 72 as shown in FIG. 1. A rectangular plate 76 is welded inside the opening 78 of the fill pipe to facilitate a chain or the like connection for connecting the fuel cap 72 thereto to prevent loss.

When filling the fuel tank through the fuel fill conduit 54, the fuel cap 72 is removed and a fuel nozzle is introduced through the circular opening 78 in the fill pipe 70 at which time the fuel fill is actuated to introduce fuel into the conduit 54.

In the illustrated embodiment, the fuel delivery nozzle (not shown) is conventional for such an application and is capable of delivering fuel to the tank through the conduit 54 at a fill rate of approximately 20 gallons per minute. Because of the square cross section of the fuel fill conduit, the flow of fuel at the specified rate is readily established through the conduit without the formation of a flow vortex in the conduit. As a result, uninterrupted flow of fuel is allowed through the conduit 54 into the tank 22 while at the same time allowing the escape of air from the tank through the fill conduit 54 without "burping" or without a discharge of fuel from the fuel fill pipe 70. It is believed that the configuration described will provide satisfactory results with flow rates up to about 25 gallons per minute. A square cross section having sides of between two and one-half (2½) to five (5) inches may be used in the illustrated embodiment to provide somewhat reduced or increased flow rates, respectively.

It should be appreciated that while a fuel fill conduit 54 having a square cross section is described, and while specific dimensions for the length of the conduit 54 and the sides of the square cross section of the conduit are described in detail herein, other combinations of fuel conduit length and cross section will provide a like result.

By way of example, it is contemplated that a fuel fill conduit 54 having a cross section, which forms a polygon having as few as three sides and up to and including a hexagon (eight sides) will provide similar desirable results. It is likewise contemplated that higher rates of flow may be accommodated with an appropriately sized cross sectional shape and area of the conduit and length combination. It is further contemplated that a conduit length of between six (6) inches and thirty-six (36) inches will provide satisfactory results with the appropriate polygonal cross section and cross sectional area.

Accordingly, while not all combinations have been tried, and thus cannot be specifically defined herein, it is intended that the scope of the claims encompass a wide range of combinations of conduit length, conduit cross sectional shapes and flow rate, which will preclude vortex formations.

It should be appreciated that the present invention is applicable to liquids other than diesel fuel.

What is claimed is:

1. A conduit for filling a tank with a liquid, said conduit comprising:
    an outlet end having a liquid outlet opening therein adapted to be fluidly coupled to the tank;
    an inlet end having a liquid inlet opening therein, said inlet opening being adapted to be operatively engaged by a source of liquid, the elevation of said inlet opening being vertically spaced from said outlet opening by a predetermined distance;
    an intermediate liquid conducting section adapted to receive liquid introduced through said inlet opening and to conduct the liquid to said outlet opening, said liquid conducting section having a length and a cross sectional shape therethrough, which in combination preclude the formation of vortex flow in said conduit at a predetermined rate of liquid flow therethrough and wherein said inlet opening is horizontally spaced from said outlet opening.

2. The conduit of claim 1 wherein the shape of said cross section of said liquid conducting section is a polygon.

3. The conduit of claim 2 wherein said polygon has between three and eight sides.

4. The conduit of claim 2 wherein said polygon is a square.

5. The conduit of claim 1 wherein said predetermined distance is between approximately six inches and thirty-six inches, and said cross sectional shape is a polygon.

6. The conduit of claim 5 wherein said polygon has between three and eight sides.

7. The conduit of claim 6 wherein said polygon is a square, having sides of between three to five inches.

8. The conduit of claim 7 wherein the sides of said square are approximately three and one-half inches, said predetermined distance is approximately nineteen inches and said rate of liquid flow is up to about twenty-five gallons per minute.

* * * * *